United States Patent [19]

Segers

[11] Patent Number: 5,554,018
[45] Date of Patent: Sep. 10, 1996

[54] TRANSMISSION WITH REVOLVING BEARING AND SEAL USED HEREBY

[75] Inventor: Jozef Segers, Lier, Belgium

[73] Assignee: Atlas Copco AirPower naamloze vennootschap, Belgium

[21] Appl. No.: 274,169

[22] Filed: Jul. 14, 1994

[30] Foreign Application Priority Data

Jul. 14, 1993 [BE] Belgium ................ 09300729

[51] Int. Cl.$^6$ .............. F01C 1/04; F01C 19/12; F16C 3/06
[52] U.S. Cl. .................. 418/55.4; 418/55.6; 74/570
[58] Field of Search ............... 418/55.4, 55.6; 277/30, 134; 74/86, 570

[56] References Cited

U.S. PATENT DOCUMENTS 4,723,350  2/1988  Kobayashi et al. .............. 277/134

FOREIGN PATENT DOCUMENTS

| 0380439 | 8/1990 | European Pat. Off. . | |
|---|---|---|---|
| 4100328A1 | 7/1991 | Germany . | |
| 61-205385 | 9/1986 | Japan ................ | 418/55.6 |
| WO93/21464 | 10/1993 | WIPO . | |

OTHER PUBLICATIONS

Patent Abstracts of Japan, Publication No. JP1029685, (Tadashi), Jan. 31, 1989.
Patent Abstracts of Japan, Publication No. JP2275084, (Masayuki) Nov. 9, 1990.
Soviet Patent Abstracts, Section PQ, Week 9111, Derwent Publications Ltd., London, GB Publication No. SU-A-1 576 724 (Lengd Refrige Ind), Jul. 7, 1990.

*Primary Examiner*—John J. Vrablik
*Attorney, Agent, or Firm*—Bacon & Thomas

[57] ABSTRACT

A transmission provided with revolving bearing (15) includes a main shaft (11), a main bearing house (6) in which the main shaft (11) is supported on bearings (12), a secondary shaft (13) that is connected to the main shaft (11) and revolves around a geometrical axis (7) defined by the main shaft (11) whose geometrical axis (14) is parallel to but eccentrically offset in relation to the geometrical axis (7) of the main shaft (11), and a revolving bearing house (16) in which the secondary shaft (13) revolving together with the bearing house (16) is supported on the revolving bearing (15) in a revolving manner around its geometrical axis. The transmission contains a seal (17) which is situated between the inside of the main bearing house (6) and the outside of the revolving bearing house (16), seals the opening between these bearing houses (6 and 16) and is fixed in relation to the whole consisting of the main shaft (11) and the secondary shaft (13).

13 Claims, 3 Drawing Sheets

5,554,018

TRANSMISSION WITH REVOLVING BEARING AND SEAL USED HEREBY

BACKGROUND OF THE INVENTION

The invention concerns a transmission with revolving bearing containing a main shaft, a main bearing house in which said main shaft is supported on bearings, a secondary shaft connected to the main shaft and revolving around the geometrical axis of the main shaft, whose geometrical axis is parallel to but eccentrically in relation to the geometrical axis of the main shaft, and a revolving bearing house in which the secondary shaft revolving together with the bearing house is supported on the revolving bearing in a revolving manner according to its geometrical axis.

Such transmissions are used among others to drive a coil compressor. The fixed coil is fixed in relation to the stationary main bearing house, whereas the moveable coil working in conjunction with it is fixed in relation to the revolving bearing house.

Among others in such applications, the bearings of the transmission are greased and sealed separately. At very high rotary speeds of the transmission, whereby the coil compressors can work with a greater capacity and a greater output, the centrifugal load on the revolving bearing largely increases.

Very thorough greasing becomes necessary. Grease can no longer guarantee this. Oil lubrication is not applied because of sealing problems due to the special movement of the revolving bearing.

SUMMARY OF THE INVENTION

The invention aims to remedy this disadvantage and to provide a transmission with revolving bearing whereby oil lubrication can be applied and subsequently a very good lubrication and a very high speed can be obtained.

This aim is reached according to the invention because the transmission contains a seal which is situated between the inside of the main bearing house and the outside of the revolving bearing house, seals the opening between these bearing houses and is fixed in relation to the whole consisting of the main shaft and the secondary shaft.

In a particular embodiment according to the invention, the seal contains a ring which is fixed on a radially protruding part which extends into or opposite the opening between the inside of the main bearing house and the outside of the revolving bearing house and which stands on the whole consisting of the main shaft and the secondary shaft.

In a particular embodiment according to the invention, screw thread is provided on one of the sides formed by the inside of the main bearing house opposite the seal and the opposite outside of the seal.

In another peculiar embodiment of the invention, the screw thread is provided on one of the sides formed by the outside of the revolving bearing house opposite the seal and the opposite inside of the seal.

The invention also concerns the seal as such from the transmission according to any of the previous embodiments.

BRIEF DESCRIPTION OF THE DRAWINGS

In order to better explain the characteristics according to the invention, the following preferred embodiment of a transmission with revolving bearing and of a seal used hereby is given as an example only without being limitative in any way, with reference to the accompanying drawings, where.

BRIEF DESCRIPTION OF THE PREFERRED EMBODIMENTS

Figure 1:
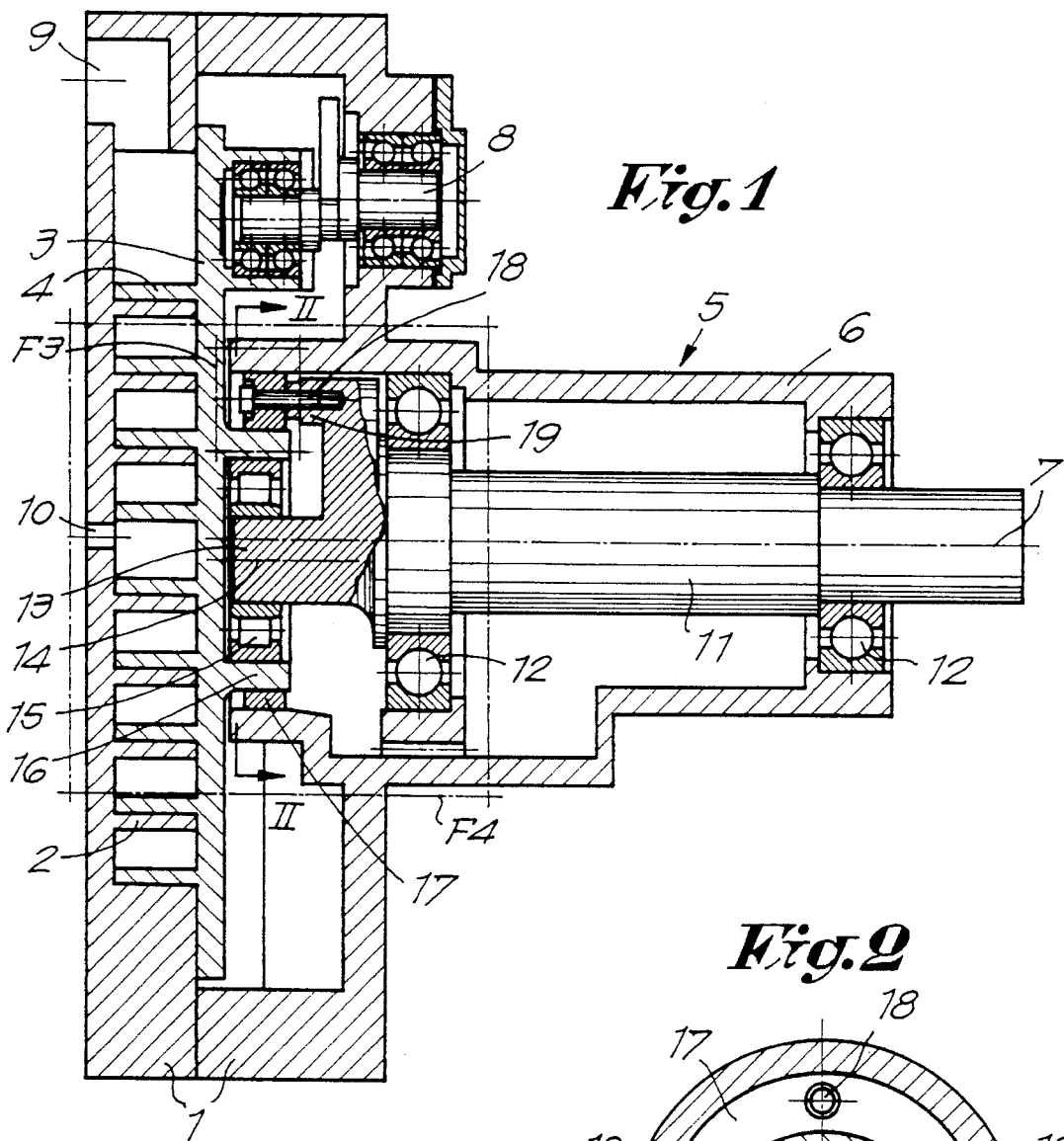
FIG. 1 shows a cross section of a transmission with revolving bearing according to the invention, mounted in a coil compressor.

FIG. 1 shows a coil compressor which mainly consists of a two-part housing 1 with a fixed coil 2, an element 3 revolving in this housing with the moveable coil 4 which works in conjunction with the above-mentioned fixed coil 2, and a drive for this moveable element 3, consisting of an engine which is not represented in the figures and a transmission 5 according to the invention.

The housing 1 turns into a main bearing house 6 on one side which is part of the transmission 5. On a flat part of the inside of the opposite side of the housing 1 stands the fixed coil 2.

The revolving element 3 is situated between the above-mentioned flat part and the main bearing house 6 and provided on the flat side diverted from the main bearing house 6 with a coil 4 which works in conjunction with a coil 2. This moveable element 3 makes a circular movement around a geometrical axis 7 inside the housing 1. Said element 3 is hereby lead by among others three crankshafts 8 of which one shaft part in the element 3 and the other shaft part in the housing 1, next to the main bearing house 6, is supported on bearings. The housing 1 is provided next to the coil 2 with an entrance 9 for the air to be compressed and provided in the middle of the coil 2 with an exit 10 for the compressed air.

The transmission 5 which causes the circular movement of the element 3 contains a main shaft 11 which is supported on two ball bearings 12 in the main bearing house 6. The geometrical axis of the main shaft 11 coincides with the above-mentioned geometrical axis 7.

To one end of the main shaft 11 is eccentrically connected a secondary shaft 13 whose geometrical axis 14 is parallel to but situated at a short distance from the above-mentioned geometrical axis 7. The revolving element 3 can rotate around the geometrical axis 14 and is mounted on the secondary shaft 13 by means of a revolving bearing 15 and is provided to this end on the side of the transmission 5 with a collar which forms the revolving bearing house 16 around the bearing 15.

Figure 2:
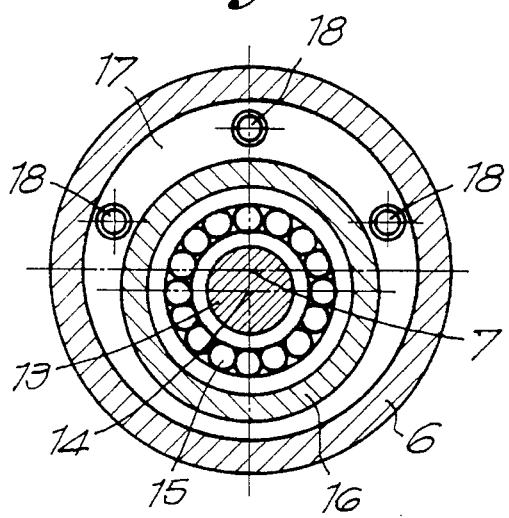
FIG. 2 shows a section according to line II—II in FIG. 1.

On the side of the revolving element 3, the opening between the outside of the moving bearing house 16 and the inside of the main bearing house 6 is sealed by means of a seal consisting of a ring 17 whose circumference, as represented in FIG. 2, has a changing width. This ring 17 is fixed by means of three protruding bolts 18 on a radially extending part 19 of the main shaft 11 which extends radially to up against the main bearing house 6.

Figure 3:
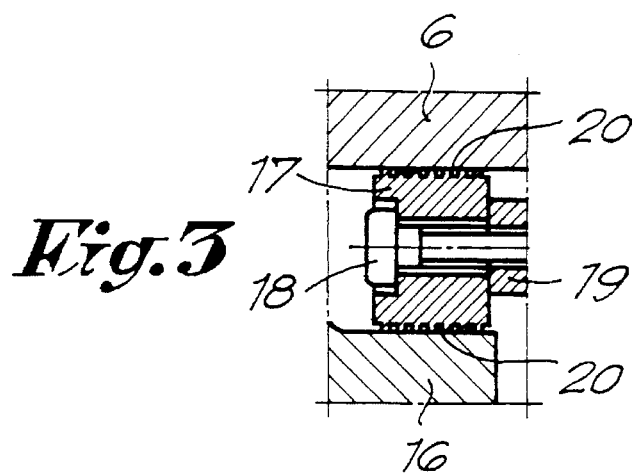
FIG. 3 shows the part indicated by F3 in FIG. 1 to a larger scale.

The ring 17 is, both on its outer edge which is situated opposite the inside of the main bearing house 6 and on its inner edge which is situated opposite the outside of the moving bearing house 16, provided with screw thread 20, as represented in detail in FIG. 3. This screw thread 20 is directed such that oil flowing from the main bearing house 6 in the direction of the element 3 is automatically returned.

As the main shaft 11 rotates, the secondary shaft 13 carries out a circular movement around the axis 7. As a result, via the revolving bearing 15, also the revolving element 3, which is prevented among others by the crankshafts 8 from rotating on itself, carries out a circular movement in the housing 1 around the axis 7.

Consequently, air between the moveable coil 4 and the fixed coil 2 is displaced and compressed. Also the bearing house 16 standing fixed on the element 3 carries out the same circular movement around the axis 7, whereby the secondary shaft 13 carries out a rotation around its geometrical axis in relation to the bearing house 16.

The inner edge of the ring 17 also carries out a circular movement around the axis 7 and simultaneously turns around the geometrical axis 14 and thus also around the moving bearing house 16 which carries out the same circular movement as the inner edge of the ring 17. Thus, the inner edge of the ring 17 only makes a rotating movement in relation to the outside of the bearing house 16 around the centre of this bearing house 16.

The ball bearings 12 and especially the revolving bearing 15 are lubricated by means of oil which is situated in the main bearing house 6. Thanks to the ring 17, the oil cannot leave the main bearing house 6 at the side of the revolving element 3.

Figure 4:
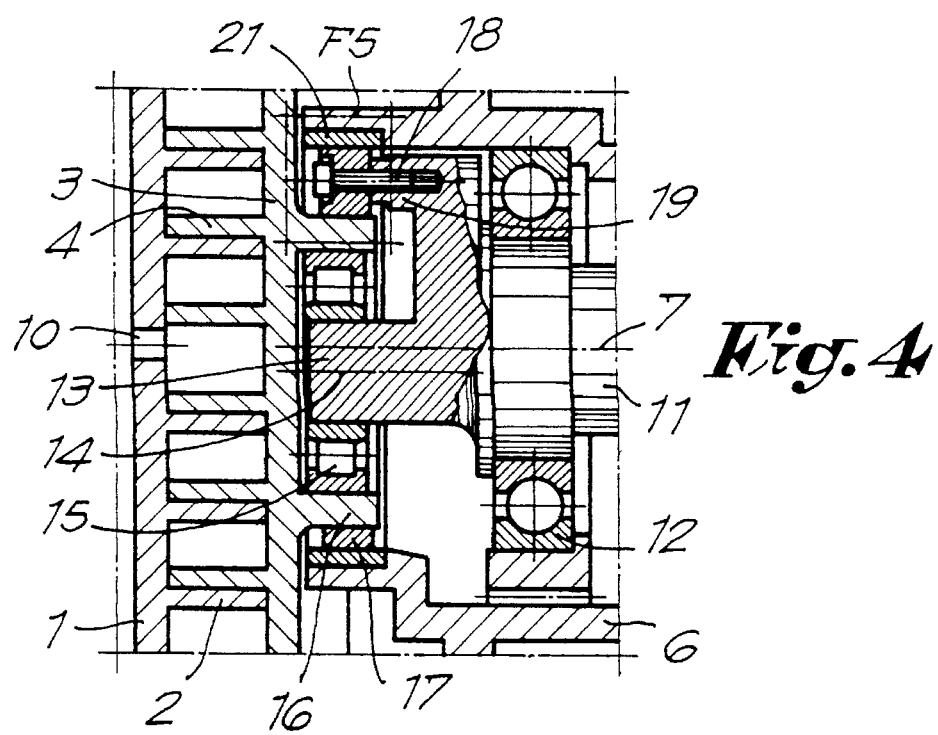
FIG. 4 shows the part indicated by F4 in FIG. 1, but with reference to another embodiment of the invention.
Figure 5:
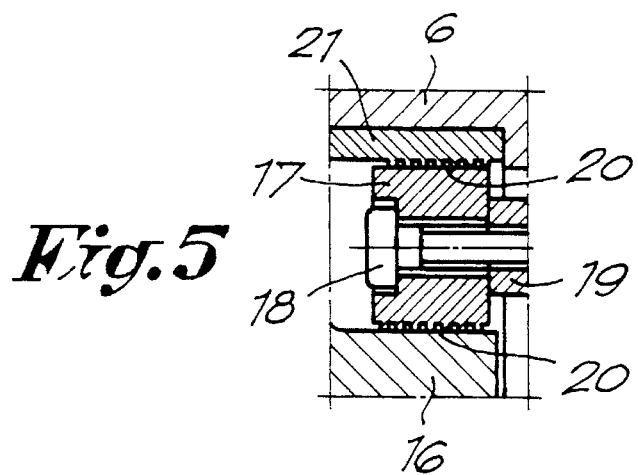
FIG. 5 shows the part indicated by F5 in FIG. 4 to a larger scale.

The embodiment of the transmission 5 to which the FIGS. 4 and 5 are related merely differs from the above-described embodiment in that the seal formed by the ring 17 is provided with screw thread 20 only on the inside of the ring opening, i.e. on the side directed towards the main bearing house 16, and in that the outer screw thread 20 is not provided in the outside of the ring 17 but opposite said outside, in the inside of the main bearing house 6 or more in particular in an insert ring 21 which is cased in the inside of the main bearing house 6 in a fixed way.

Naturally, this embodiment offers the same advantages as the first-described embodiment.

Thanks to the screw thread 20, no contact is required between the ring 17 and the bearing houses 6 and 16. By making use of the rotation, both of the outside of the ring 17 in relation to the inside of the main bearing house 6, as of the inside of the ring 17 in relation to the inside of the moving bearing house 16, in combination with a suited screw thread 20 on one of the opposite sides, a contact-free seal is obtained. Consequently, the wear and tear and heat development are minimal. Thanks to the good lubrication, the main shaft 11 can be driven at a high speed.

Figure 6:
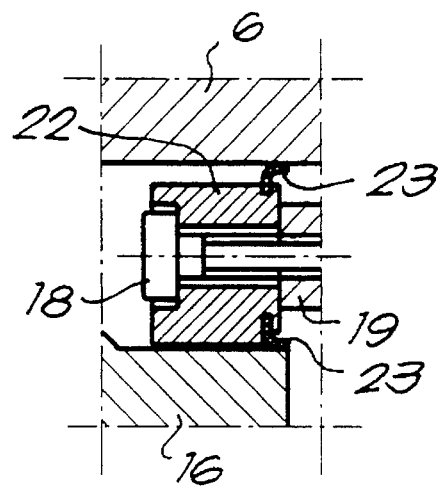
FIG. 6 shows a part analogous to that in FIGS. 3 and 5, but with reference to a third embodiment of the invention.
Figure 7:
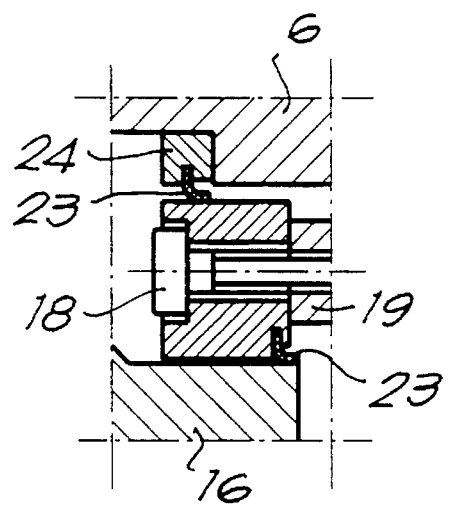
FIG. 7 shows a part analogous to that in FIGS. 3, 5 and 6, but with reference to a fourth embodiment of the invention.
Figure 8:
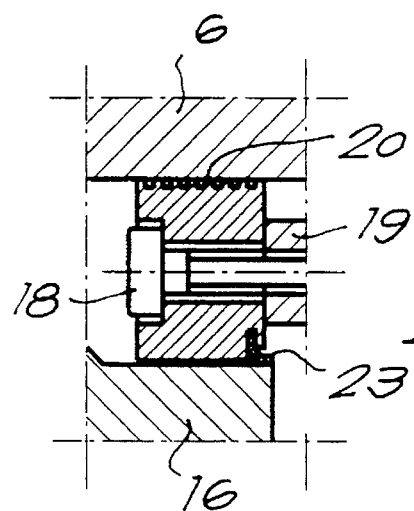
FIG. 8 shows a part analogous to that in FIGS. 3, 5, 6 and 7, but with reference to a fifth embodiment of the invention.

The embodiments according to the FIGS. 6 to 8 differ from the above-described embodiments in that the seal, apart from an actual ring 22, has at least one sealing lip 23, for example made of synthetic material. The ring 22 coincides with the ring 17 and is fixed in a similar manner by means of bolts 18 on the part 19 of the main shaft 11.

In the embodiment according to FIG. 6, both on the outer circumference and on the inner circumference of the ring 22 is provided a sealing lip 23 which is cased in the ring 22. The two sealing lips 23 are connected elastically against the inside of the main bearing house 6 and the outside of the moving bearing house 16 respectively.

In the embodiment according to FIG. 7, only one sealing lip 23 is fixed on the ring 22, for example on the inner circumference, whereas the second sealing lip 23 is connected onto the ring 22 and is cased in a ring 24 which is fixed on a bearing house, for example the main bearing house 6.

Finally, in the embodiment according to FIG. 8, one of the sealing lips 23, for example that on the outside, is replaced by screw thread 20 on the circumference of the ring 22 or on the opposite side of a bearing house 6 or 16.

Also in the embodiments according to FIGS. 6 to 8, the seal formed by the ring 22 and one or two sealing lips 23 prevents the oil from leaving the main bearing house 6.

The invention is by no means limited to the above-described embodiments represented in the figures; on the contrary, such a transmission with revolving bearing and the seal used hereby can be made in all sorts of variants while still remaining within the scope of the invention.

In particular, the transmission should not necessarily be designed to drive a coil compressor. The invention is applicable in any case where the opening between a first bearing house surrounding a shaft and a second bearing house surrounding a bearing revolving eccentrically in relation to the above-described shaft needs to be sealed.

In the embodiments with screw thread on the inside of the ring, this screw thread can be provided on the outside of the revolving bearing house instead of on the inside of the ring.

Insofar that screw thread is provided in the main bearing house or in the revolving bearing house, said screw thread does not necessarily need to be provided in an insert ring. It might also be provided directly in the wall of the bearing house.

I claim:

1. A transmission assembly comprising:

a main bearing housing;

a main drive shaft extending into said main bearing housing;

first bearing means rotatably supporting said main drive shaft within said main bearing housing for rotation about a first rotational axis;

a secondary shaft rotatably connected to said main drive shaft, said secondary shaft being rotatable about a second rotational axis that is parallel to and eccentrically positioned with respect to said first rotational axis;

a revolving bearing housing extending within said main bearing housing and about a predetermined portion of said secondary shaft;

a revolving bearing positioned between the predetermined portion of said secondary shaft and said revolving bearing housing; and a seal situated in an opening between an inner surface portion of said main bearing housing and an outer surface portion of said revolving bearing housing, said seal preventing the passage of fluid thereacross.

2. The transmission assembly according to claim 1, further comprising a screw thread provided on at least one of the inner surface portion of the main bearing housing and an inner radial portion of the seal.

3. A transmission assembly according to claim 1, further comprising a screw thread provided on at least one of the outer surface portion of said revolving bearing housing and an outer radial portion of the seal.

4. A transmission assembly according to claim 1, further comprising a screw thread formed on both an inner radial portion of said seal, opposite said revolving bearing housing, and an outer radial portion of said seal, opposite said main bearing housing.

5. The transmission assembly according to claim 1, wherein said seal is fixed for rotation with said main drive shaft and said secondary shaft.

6. A transmission assembly according to claim 5, wherein said seal has a variable annular width.

7. The transmission assembly according to claim 5, wherein the seal comprises a ring fixed on a radially protruding part that extends toward the opening between the inner surface portion of the main bearing housing and the outer surface portion of the revolving bearing housing, said radially protruding part being fixed for rotation with said main drive shaft and said secondary shaft.

8. The transmission assembly according to claim 7, wherein said seal includes a sealing lip extending between said ring and at least one of the inner surface portion of said main bearing housing and the outer surface portion of said revolving bearing housing.

9. The transmission assembly according to claim 8, wherein said seal includes a pair of sealing lips with one of said pair of sealing lips extending between said ring and the inner surface portion of said main bearing housing and the other of said pair of sealing lips extending between said ring and the outer surface portion of said revolving bearing housing.

10. A transmission assembly according to claim 1, further comprising an insert ring positioned between said seal and said main bearing housing.

11. A transmission assembly according to claim 10, wherein said insert ring is formed with a screw thread at an inner radial portion thereof adjacent said seal.

12. A transmission assembly according to claim 10, wherein said seal includes a sealing lip carried by one of the inner surface portion of said main bearing housing, opposite said insert ring, and said insert ring.

13. A transmission assembly according to claim 10, wherein said seal includes a sealing lip carried by one of the outer surface portion of said revolving bearing housing, opposite said insert ring, and said insert ring.

* * * * *